US012027807B2

(12) United States Patent
Karrasch

(10) Patent No.: US 12,027,807 B2
(45) Date of Patent: Jul. 2, 2024

(54) ADJUSTABLE FUNNEL OR GUIDE FOR A TERMINAL APPLICATOR

(71) Applicant: TE Connectivity Solutions GmbH, Schaffhausen (CH)

(72) Inventor: Christopher John Karrasch, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/863,545

(22) Filed: Jul. 13, 2022

(65) Prior Publication Data

US 2024/0022035 A1 Jan. 18, 2024

(51) Int. Cl.
*H01R 43/052* (2006.01)

(52) U.S. Cl.
CPC .................................. *H01R 43/052* (2013.01)

(58) Field of Classification Search
CPC ................ H01R 43/052; H01R 43/048; Y10T 29/53235; Y10T 29/5313
See application file for complete search history.

(56) References Cited

U.S. PATENT DOCUMENTS

| | | | | |
|---|---|---|---|---|
| 3,710,483 | A | 1/1973 | Morgan et al. | |
| 4,114,253 | A * | 9/1978 | Loomis | H01R 43/04 29/566.2 |
| 4,856,183 | A * | 8/1989 | Belaidouni | H01R 43/055 29/761 |
| 5,495,662 | A * | 3/1996 | Nitta | H01R 43/052 29/760 |
| 5,511,307 | A * | 4/1996 | Reiersgaard | H01R 43/04 29/748 |
| 5,907,901 | A * | 6/1999 | Hogan, Jr. | H01R 43/048 29/760 |
| 10,454,234 | B2 | 10/2019 | Particka et al. | |
| 11,088,502 | B1 * | 8/2021 | Tillotson, Jr. | H01R 43/28 |

OTHER PUBLICATIONS

International Search Report, International App. No PCT/IB2023/057206 International Filing Date Jul. 13, 2023.

* cited by examiner

*Primary Examiner* — Minh N Trinh

(57) ABSTRACT

A cable guiding device of a terminal applicator comprises a movable funnel portion defining a tapered opening sized to receive an end of a cable to be terminated, a funnel stop limiting motion of the movable funnel portion in a first direction, and a first elastic element biasing the movable funnel portion in the first direction.

20 Claims, 7 Drawing Sheets

ADJUSTABLE FUNNEL OR GUIDE FOR A TERMINAL APPLICATOR

FIELD OF THE INVENTION

The present disclosure relates to the processing of wires or cables and associated terminals, and more specifically, to improved devices for aiding in the fixation of terminals to wires.

BACKGROUND

Crimping or terminating systems for securing a terminal onto an element, such as an electrical conductor, typically include an applicator configured to feed a strip of terminals from a reel into position for crimping onto the conductor. More specifically, the applicator feeds a terminal into position above a lower crimping tool or die, after which an applicator ram drives an upper crimping tool toward the lower crimping tool. As the applicator ram is moved, a passive terminal shear or shear tool separates the terminal from the strip just after the terminal is captured in the crimping tooling. In applications that include a cable having a previously-crimped terminal fixed thereto (e.g., a center contact crimped to a central conductor of the cable), the applicator ram is lowered to hold the terminal (or outer contact) in place as the cable and previously-crimped terminal are placed therein, after which a crimping operation is performed for fixing the terminals together to form a terminal assembly.

Currently, terminal applicators may employ a spring loaded funnel or guide that extends from the upper tooling a fixed distance to guide a cable or wire. This spring loaded funnel will meet the lower tooling in the applicator to determine its position. This position is not adjustable. Specifically, the cable or wire and its previously-crimped terminal must travel through the outer contact, and into a receiving socket thereof prior to final crimping. During this process, however, the center wire or conductor of the cable may be bent or otherwise mispositioned. In other words, the previously-crimped terminal or center contact is oriented at an angle relative to the cable centerline. As the cable is presented into the terminal or outer contact, misalignment of the center contact can result in it catching on the outer contact. This may damage the center contact and/or prevent its proper insertion into the outer contact entirely.

Accordingly, there is a need for improved systems and methods for addressing the above-described deficiencies.

SUMMARY

In one embodiment of the present disclosure, a cable guiding device of a terminal applicator comprises a movable funnel portion defining a tapered opening sized to receive an end of a cable to be terminated, a funnel stop limiting motion of the movable funnel portion in a first direction, and a first elastic element biasing the movable funnel portion in the first direction.

BRIEF DESCRIPTION OF THE DRAWINGS

The invention will now be described by way of example with reference to the accompanying Figures, of which.

DETAILED DESCRIPTION OF THE EMBODIMENTS

Figure 1A:
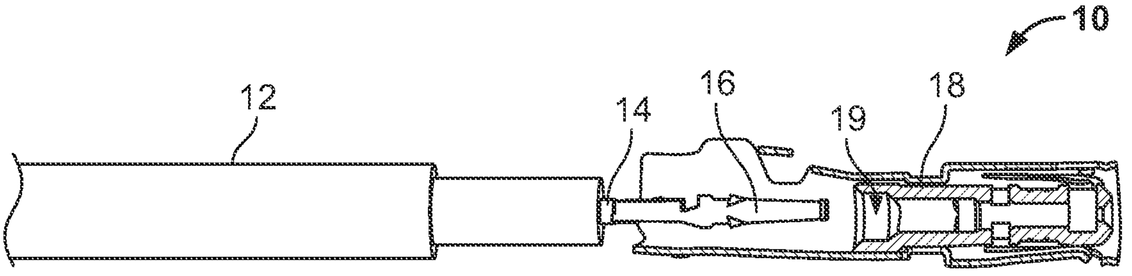
FIG. 1A is a partial side cross-sectional view of a cable assembly useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a mechanical device adapted to position at least one wire or cable as it is inserted into a connector assembly or terminal held by a terminal applicator. Specifically, embodiments include an adjustable funnel for terminal applicators having a spring-loaded stop that is biased toward an adjustment cam. A separate spring-loaded funnel is biased against the stop to set a height of the funnel relative to the connector assembly to be terminated. The funnel guides cables or wires, including those having bent terminals fixed thereto, into an outer terminal or connector assembly located in a termination position of the applicator prior to being crimped onto the cable. Embodiments of the present disclosure have an adjustable height and can be set such that, when the center conductor or terminal of the cable is raised altered relative to the cable centerline, the funnel will guide the conductor into a receiving slot of a terminal or connector assembly adapted to be fixed thereto. The funnel is spring-loaded to allow it to stay in position above the cable during the termination process. The spring-loaded funnel stop allows for quick and easy adjustment of the funnel height relative to the terminal or connector assembly.

Referring generally to FIGS. 1A-1D, a cable assembly 10 useful for describing embodiments of the present disclosure is shown. The assembly 10 includes a cable 12 having a central conductor 14. In the exemplary embodiment, a center contact or terminal 16 has been previously fitted (e.g., crimped or soldered) to a free end of the conductor 14. An outer terminal or connector 18 includes a cavity 19 sized to receive the terminal 16. Once positioned therein, the outer connector 18 and the cable 12 are joined, such as via crimping, in order to complete the assembly 10.

Figure 1B:
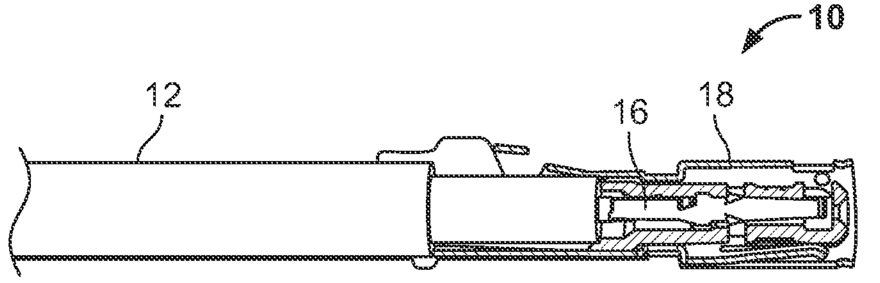
FIG. 1B is another partial side cross-sectional view of the cable assembly of FIG. 1A.
Figure 1C:
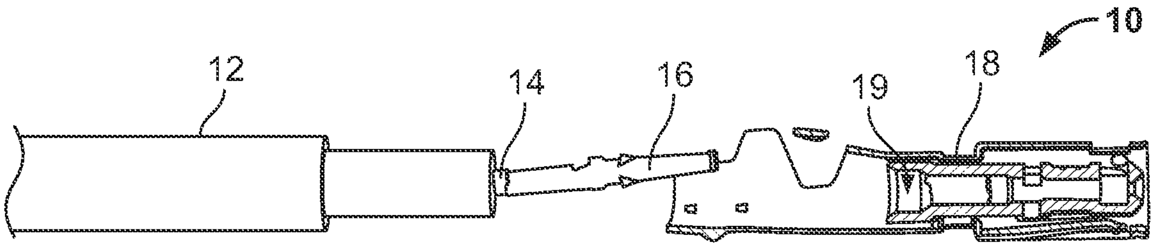
FIG. 1C is another partial side cross-sectional view of the cable assembly of FIG. 1A.
Figure 1D:
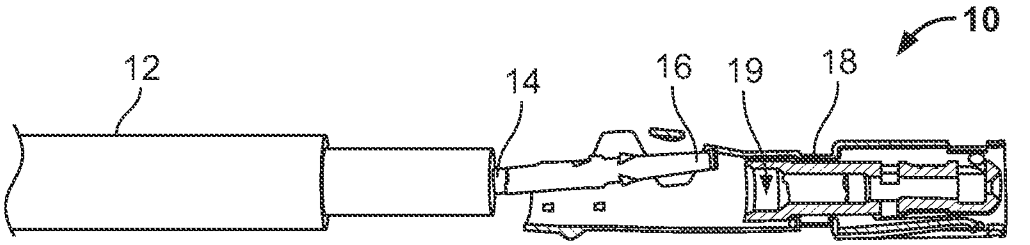
FIG. 1D is another partial side cross-sectional view of the cable assembly of FIG. 1A.

FIG. 1A illustrates an ideal condition, wherein the terminal 16 is generally aligned concentrically with the cable 12. The terminal 16 enters the cavity 19 of the outer contact or connector 18 as the cable is moved in an axial direction, prior to the outer contact being terminated to form the cable assembly 10. FIG. 1B shows terminal 16 properly inserted into cavity 19 of outer contact 18. In distinction, FIG. 1C illustrates a non-ideal condition, wherein the terminal 16 has been bent or deformed, such as via mishandling or as a result of its prior termination process. As shown in FIG. 1D, as the terminal 16 of FIG. 1C is inserted into the cavity 19, it is susceptible to catching or interfering with a wall of the connector 18. This contact or interference may result in damage to the terminal 16, by way of non-limiting example. The misaligned terminal 16 may result in its failure during subsequent crimping, or its inability to be inserted into the cavity 19. Embodiments of the present disclosure aim to reduce or eliminate these processing errors by accommodating various angular discrepancies of the cable or center contact during the insertion or positioning process.

Figure 2A:
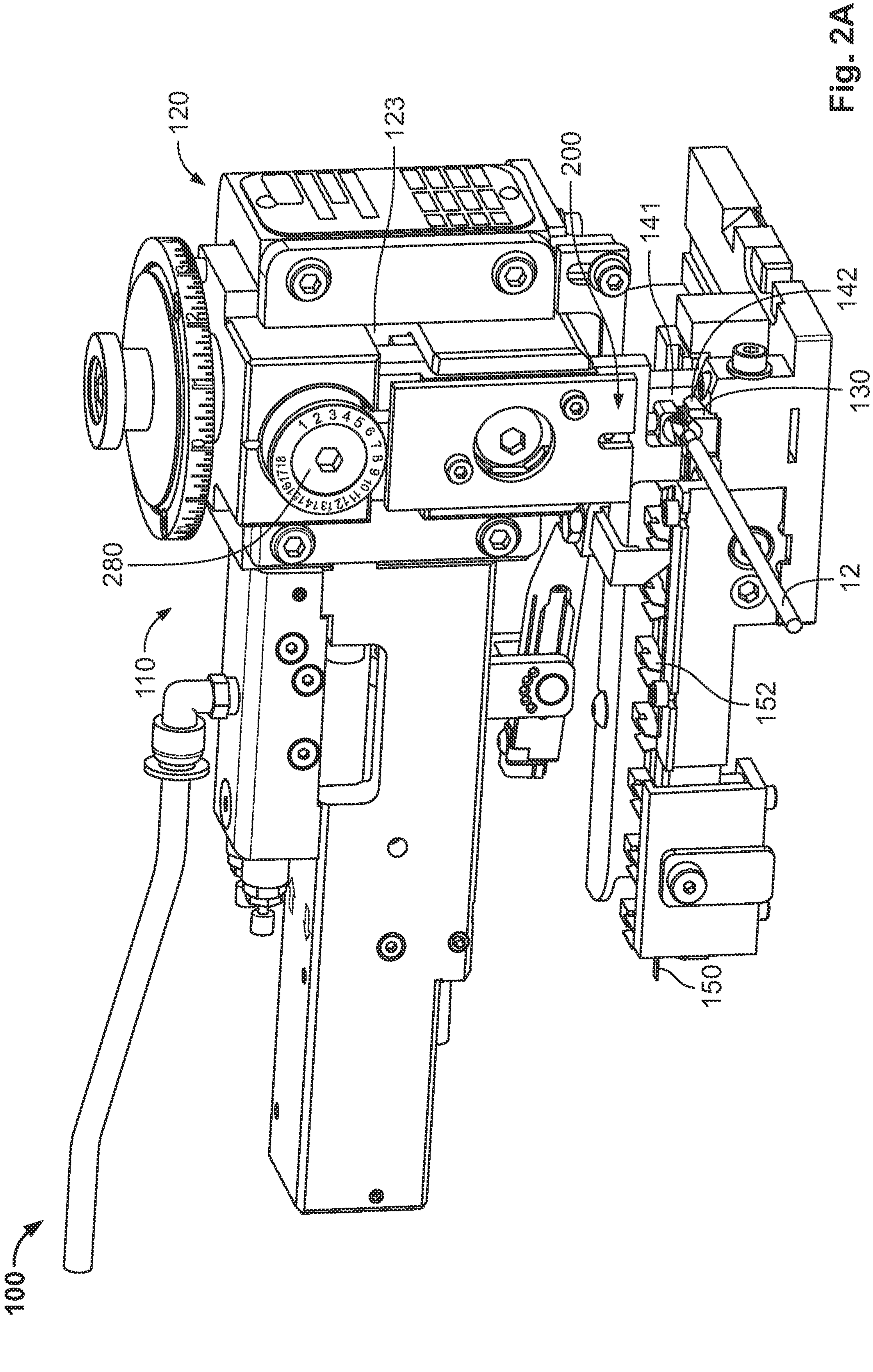
FIG. 2A is a perspective view of a terminal applicator system according to embodiments of the present disclosure.
Figure 2B:
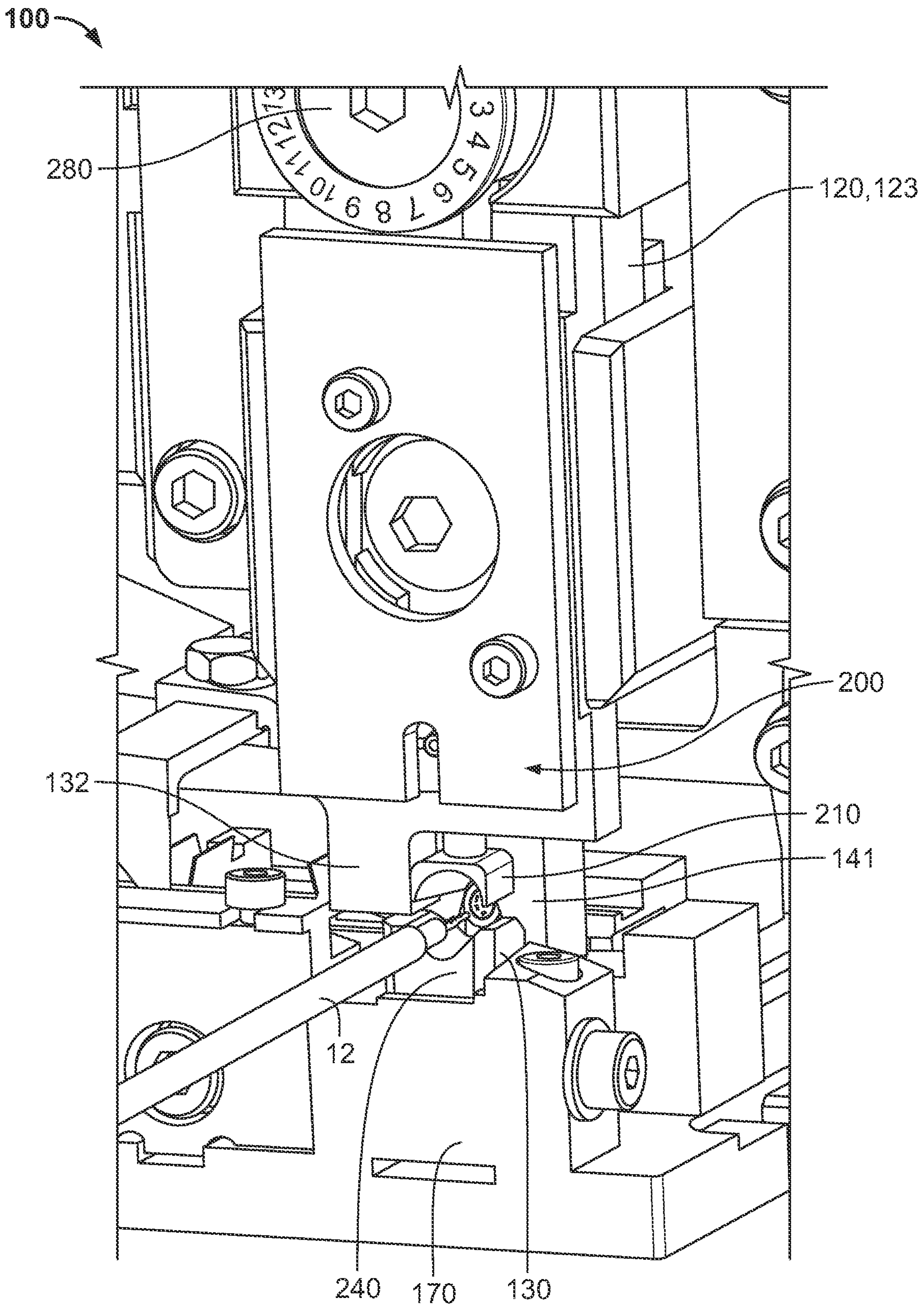
FIG. 2B is a partial perspective view of the terminal applicator system of FIG. 2A.

Referring generally to FIGS. 2A and 2B, embodiments of the present disclosure will be described in use with an exemplary crimping system 100. The crimping system 100 includes an applicator or applicator assembly 110, a ram assembly 120, a terminal shear 130 and a crimping die or tooling. The system 100 is adapted to crimp a terminal 152 (e.g., the outer contact or connector 18 of FIGS. 1A-1D) sheared from a terminal strip or carrier 150 including a plurality of interconnected terminals. Specifically, the terminal applicator 110 feeds the terminal strip 150 into a crimping position. The crimping die or tooling includes a movable upper crimping die 141, and an opposing stationary lower die 142 between which the terminal 152 is arranged in the crimping position. The upper crimping die 141 is fixedly connected to a movable end of an applicator ram or crimping actuator 123 of the ram assembly 120. The applicator ram 123 may include, for example, one or more pneumatic or hydraulic cylinders or a motor-driven mechanism for selectively moving the crimping die 141 in the vertical direction (s) during crimping operations.

Figure 2C:
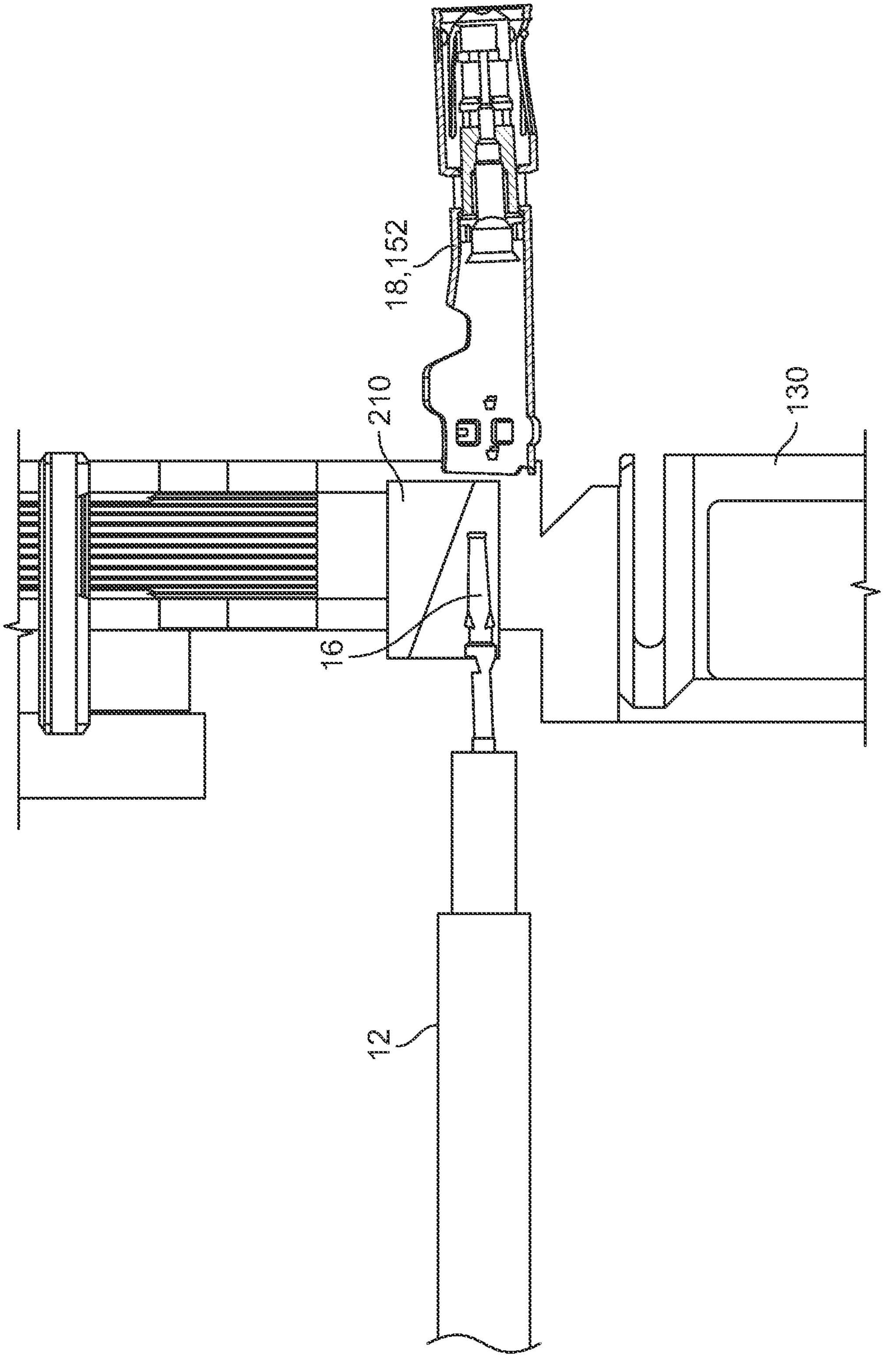
FIG. 2C is a side perspective view of the cable assembly of FIG. 1A prior to its insertion into a terminal.

When crimping the terminal 152 to a wire or other element (e.g., the center terminal 16 of FIGS. 1A-1D), the applicator assembly 110 feeds the terminal strip 150 and associated terminal 152 into the point of termination above the lower crimp tooling 142. The ram assembly 120 is lowered which causes the shear depressor 132 to lower the terminal shear 130 which separates the terminal 152 (e.g., the outer contact or connector 18 of FIGS. 1A-1D) from terminal strip 150. At this point, cable assembly 12 shown in FIGS. 1A-1D is moved horizontally to insert terminal 16 into cavity 19 as shown in FIG. 2B. FIG. 2C shows the cable assembly 12 prior to insertion into terminal 152 (e.g., the outer contact or connector 18 of FIGS. 1A-1D). The previously mentioned lowering of the ram assembly 120 causes the funnel 210 to be located in a relative position to terminal 152. Using a guiding device or funnel assembly 200 according to an embodiment of the present disclosure, the end of the wire 12 or the terminal 16 is guided into a termination position within the terminal 152 (e.g., with the cavity 19 of the outer connector 18 of FIGS. 1A-1D) as shown in FIG. 1B and FIG. 2B. During a subsequent termination sequence, the ram assembly 120 lowers to crimp the terminal 152 onto the cable assembly 12 (or wire end in the case of an unterminated or bare wire) with the crimping dies 141,142.

Figure 3:
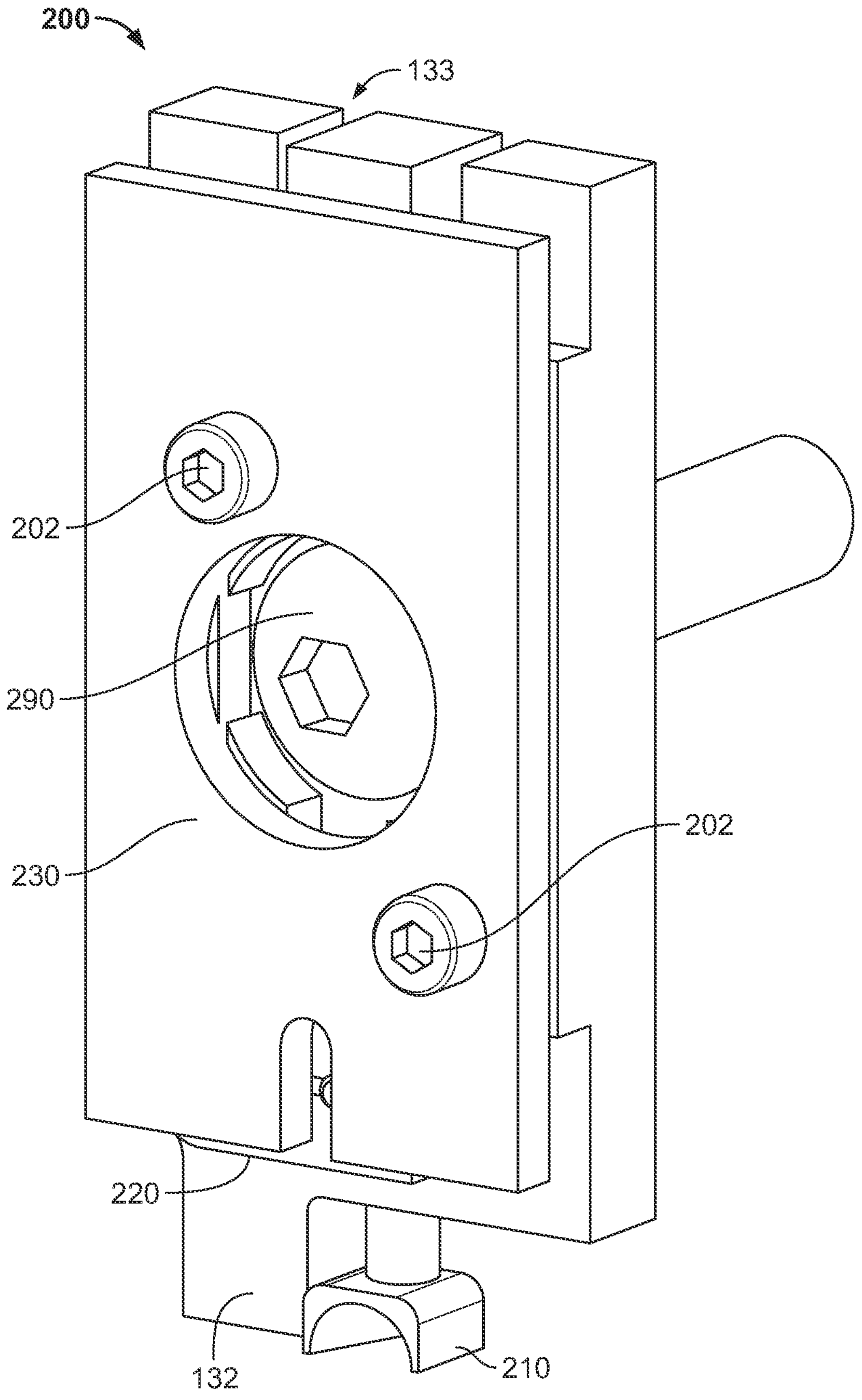
FIG. 3 is a perspective view of an alignment device or funnel according to an embodiment of the present disclosure.

In the exemplary embodiment, the funnel assembly 200 is defined integrally, with or is attached to, a shear depressor 132. The shear depressor is attached to the applicator ram 123 for operating the terminal shear 130 used to separate the terminal 152 from its terminal strip 150. Referring to FIG. 3, the funnel assembly 200 generally includes a movable funnel or first funnel portion 210, a movable funnel stop 220, and a cover 230. As set forth above, the funnel assembly 200 may be attached to the shear depressor 132. In turn, the shear depressor 132 and funnel assembly 200 may be connected to the applicator ram 123 via a fastener 290. The cover 230 may be attached to a portion or the funnel assembly 200, or to a portion of the shear depressor 132 via a plurality of fasteners 202. The funnel stop 220 may be slidably arranged within a correspondingly-shaped opening or slot 133 defined in a portion of the shear depressor 132. The cover 230 serves to retain the funnel stop 220 within the slot 133.

Figure 4:
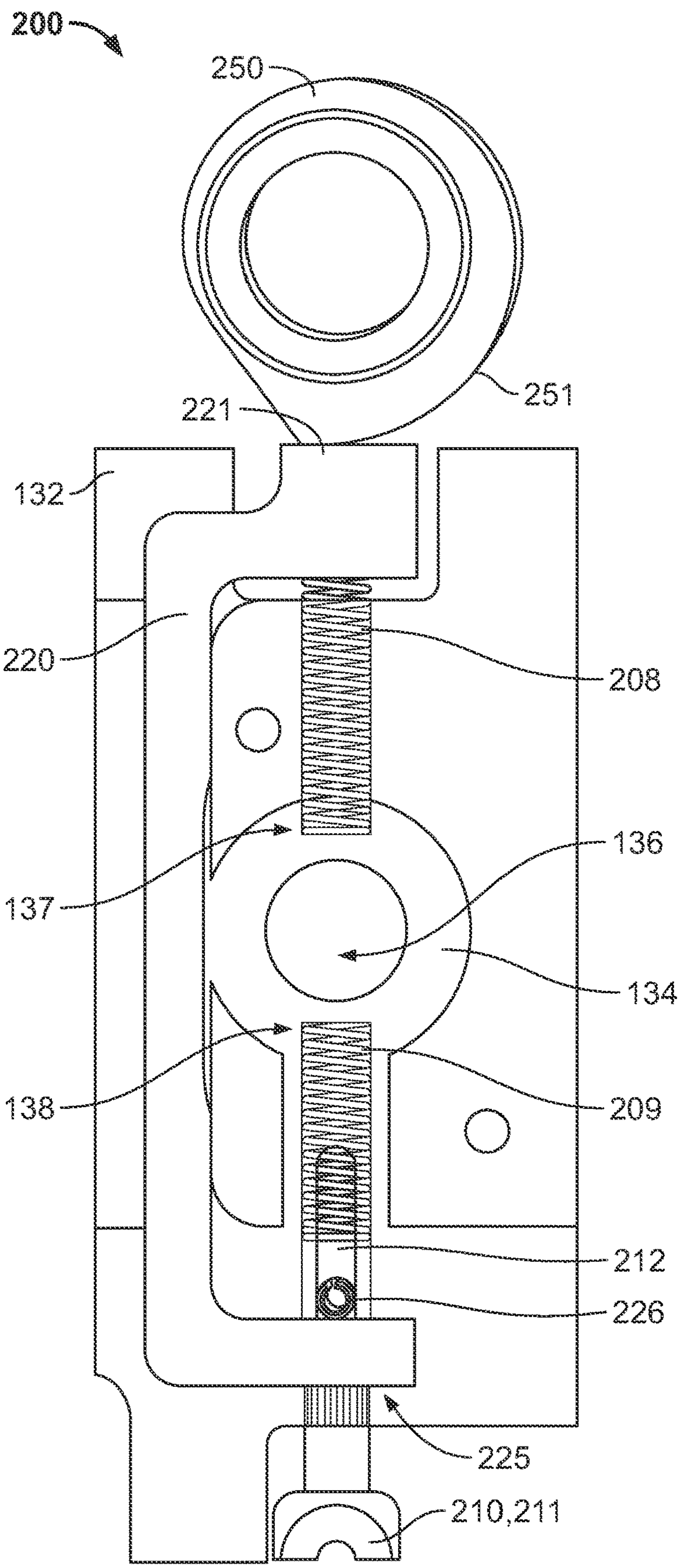
FIG. 4 is a first cross-sectional view of the alignment device of FIG. 3.
Figure 5:
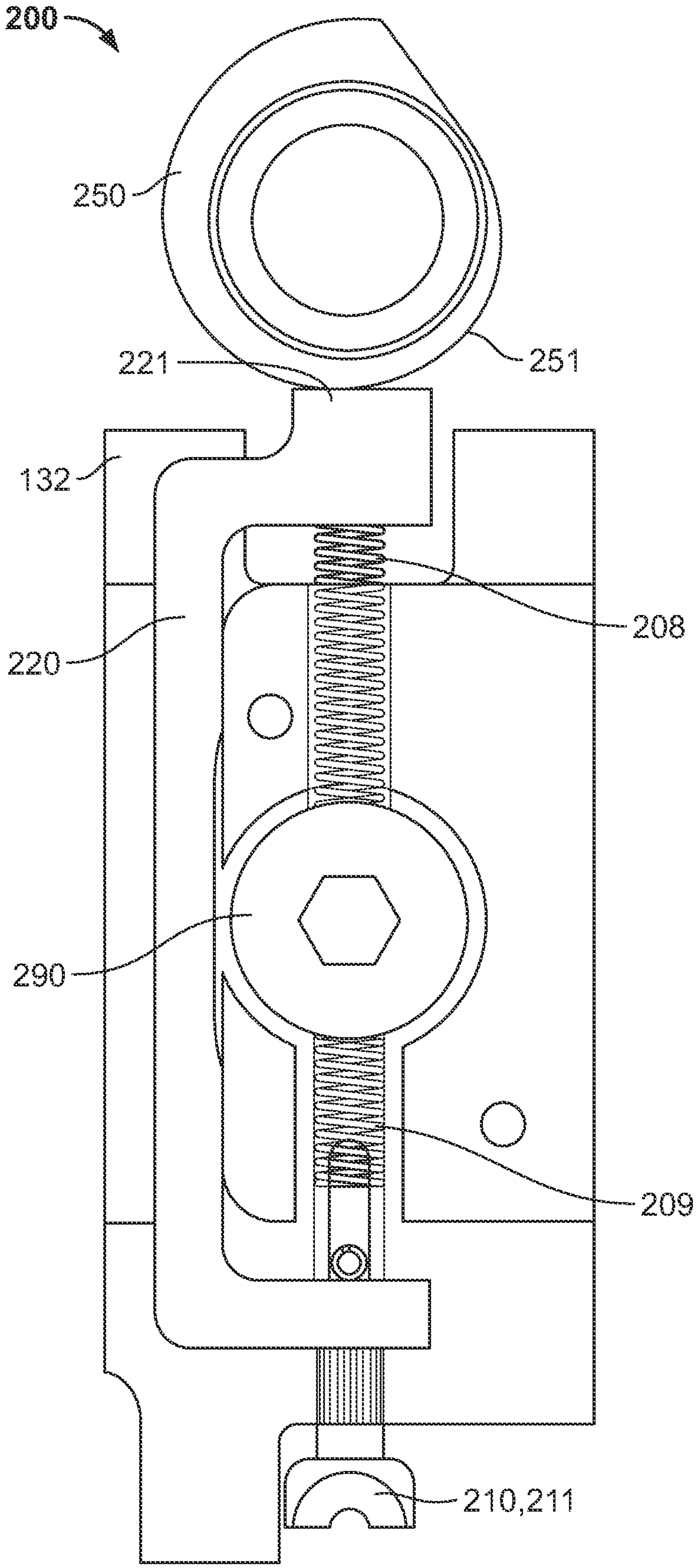
FIG. 5 is a second cross-sectional view of the alignment device of FIG. 3.

Referring to FIGS. 4 and 5, the funnel assembly 200 further includes a rotatable adjustment cam 250, and a pair of elastic elements 208,209 (e.g., compression springs). The cam 250 defines a cam surface 251 engaging with a corresponding follower surface 221 defined on the funnel stop 220. Specifically, the funnel stop 220 defines a generally C-shaped body or bracket having a first end defining the follower surface 221, and a second end supporting the movable funnel portion 210.

The first funnel portion 210 includes a tapering, semi-conical interior shape, or a portion of a funnel or conical-shaped opening 211, on a first end thereof. The first funnel portion 210 cooperates with a corresponding lower funnel or second funnel portion 240 fitted to a base 170 arranged on the base of the applicator 110 (see FIG. 2B). As shown in FIG. 2B, depression or extension of the applicator ram 132 is operative bias the first and second funnel portions 210,240 toward one another, forming a continuous or generally continuous funnel-shaped opening through which the end of the cable 12 is inserted prior to termination.

Referring again to FIGS. 4 and 5, a second end of the funnel portion 210 defines a cylinder-shaped protrusion 212. The protrusion 212 extends through a corresponding hole 225 located in the shear depressor 132. A fastener, such as a spring pin 226 is inserted through the protrusion 212 in a direction transverse to the direction of motion of the funnel portion 210, and acts as a mechanical stop limiting the motion of the funnel portion in a downward direction relative to the orientation shown in the figures under the bias of the springs 209.

The funnel stop 220 is free to move relative to the shear depressor 132, and in particular, to a mounting portion 134 thereof. The mounting portion 134 defines a circular opening 136 accepting the fastener 290. The shear depressor 132 further defines apertures 137,138 oriented transverse to an axis of the opening 136 for receiving and supporting a respective one of the compression springs 208,209 on first fixed ends thereof.

Second movable ends of each spring 208,209 are attached to, or bear against the funnel stop 220 and upper funnel portion 210, respectively. Specifically, the second end of the spring 208 bears against a side of the funnel stop 220 opposite to the follower surface 221, and the second end of the spring 209 bears against a side of the funnel portion 210 opposite the guiding portion or funnel-shaped opening 211. In one embodiment, the spring rate, or effective spring rate, of the spring 208 is higher than that of the spring 209. In this way, the funnel stop 220 is continuously biased upwardly and into maintained contact with the adjustment cam 250 and corresponding cam surface 251.

Likewise, the funnel portion 210 is continuously biased downwardly by the spring 209 until the mechanical stop or pin 226 engages with the funnel stop 220. As can be visualized from the figures, the spring 209 is operative to permit the funnel portion 210 to be initially biased upward by a cable end (or central contact thereof) as it is inserted therein. In this way, the spring 209 accommodates axial misalignment of the cable end as it is inserted into the opening of terminal 152 (outer contact 18 in FIGS. 1A-1D, see FIG. 2C). The resulting force applied on the first funnel portion 210 by the spring 209 is operative to center the cable end, or bring it toward axial alignment, as it is inserted into the opening 211 (see FIG. 1A).

Still referring to FIGS. 4 and 5, the cam surface 251 varies in the radial direction about a central axis of the cam 250. In the position illustrated in FIG. 4, the tallest point of the cam surface 251 is in contact with the follower surface 221. This position biases the funnel stop 220 downward, and in turn positions the first funnel portion 210 at its lowest position. In distinction, FIG. 5 illustrates the cam surface 251 in an intermediate position relative to the follower surface 221. This position corresponds to an intermediate minimum height of the funnel portion 210. In this way, a desired location of the first funnel portion 210 may be adjusted as needed (e.g., for differing cable/terminal configurations). Raising or lowering the first funnel portion 210 also adjusts the preload on each of the springs 208,209, which may aid in controlling the motion of cables of varying diameters and/or stiffnesses as necessary. As shown in FIGS. 2A and 2B, the rotary position of the cam 250 may be set via a dial 280, which may have numerical indicators thereon corresponding to different pre-set minimum heights of the first funnel portion 210.

It should be understood that a central axis of a funnel-shaped opening defined by the first and second funnel portions 210,240 may be coaxially aligned, or aligned in a horizontal and vertical direction with the cavity 19 of the outer terminal or connector 18 or terminal to be crimped to the cable 12. In some embodiments, the fixed funnel portion 240 defines a portion of the funnel-shaped opening that is generally aligned with a lower or bottom surface of the outer contact 18. As set forth above, the first or upper funnel portion 210 can be adjusted in height relative to the second or fixed funnel portion 240 according to, for example, the size of the outer contact 18 or terminal. Of course, fixed and movable funnel portions of varying size (e.g., varying tapered opening sizes) may also be used to accommodate different cable and or terminals. Further, while compression springs are illustrated and described, other elastic elements may be used without departing from the scope of the present disclosure (e.g., elastic materials, alternate spring configurations, etc.)

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable guiding device, comprising:

a movable funnel portion defining a tapered opening sized to receive an end of a cable to be terminated;

a funnel stop limiting motion of the movable funnel portion in a first direction;

a first elastic element biasing the movable funnel portion in the first direction; and a base, a fixed end of the first elastic element engages with the base and a second end of the first elastic element engages with the movable funnel portion.

2. The cable guiding device of claim 1, further comprising a second elastic element arranged between the funnel stop and the base, the second elastic element biasing the funnel stop in a second direction opposite the first direction.

3. The cable guiding device of claim 2, wherein the funnel stop is movable relative to the base in the first and second directions and against a biasing force of a respective one of the first and second elastic elements.

4. The cable guiding device of claim 3, further comprising a mechanical stop formed on the movable funnel portion and limiting motion of the movable funnel portion in the first direction.

5. The cable guiding device of claim 4, wherein the movable funnel portion is slidable connected to the funnel stop.

6. The cable guiding device of claim 1, further comprising a rotatable cam defining a cam surface having a varying diameter in a radial direction about an axis of rotation of the cam, the rotational position of the cam determining a maximum position of the movable funnel portion in the first direction.

7. The cable guiding device of claim 6, wherein the cam surface abuts a corresponding follower surface defined by the funnel stop.

8. The cable guiding device of claim 7, wherein an increase in a diameter of the cam surface at a point of contact with the follower surface is operative to compress the second elastic element via the funnel stop.

9. The cable guiding device of claim 8, wherein a spring rate of the second elastic element is greater than a spring rate of the first elastic element.

10. The cable guiding device of claim 9, wherein the first and second elastic elements are compression springs.

11. The cable guiding device of claim 1, wherein the base comprises a portion of a terminal depressor or crimping actuator of a terminal applicator.

12. The cable guiding device of claim 11, wherein the terminal depressor or crimping actuator defines a slot in which the funnel stop is slidable arranged and movable in the first direction.

13. The cable guiding device of claim 12, further comprising a cover retaining the funnel stop within the slot.

14. The cable guiding device of claim 1, further comprising a fixed funnel portion, the movable funnel portion and the fixed funnel portion opposing one another to define a generally conical opening sized to guide the end of the cable to be terminated.

15. A cable guiding device, comprising:

a movable funnel portion defining a tapered opening sized to receive an end of a cable to be terminated;

a funnel stop limiting motion of the movable funnel portion in a first direction;

a first elastic element biasing the movable funnel portion in the first direction; and a second elastic element arranged between the funnel stop and the base, the second elastic element biasing the funnel stop in a second direction opposite the first direction.

16. The cable guiding device of claim 15, further comprising a base, wherein a fixed end of the first elastic element engages with the base and a second end of the first elastic element engages with the movable funnel portion.

17. The cable guiding device of claim 15, wherein the funnel stop is movable relative to the base in the first and second directions and against a biasing force of a respective one of the first and second elastic elements.

18. A cable guiding device, comprising:

a movable funnel portion defining a tapered opening sized to receive an end of a cable to be terminated;

a funnel stop limiting motion of the movable funnel portion in a first direction;

a first elastic element biasing the movable funnel portion in the first direction; and a rotatable cam defining a cam surface having a varying diameter in a radial direction about an axis of rotation of the cam, the rotational position of the cam determining a maximum position of the movable funnel portion in the first direction.

19. The cable guiding device of claim 18, wherein the cam surface abuts a corresponding follower surface defined by the funnel stop.

20. A cable guiding device, comprising:

a movable funnel portion defining a tapered opening sized to receive an end of a cable to be terminated;

a fixed funnel portion, the movable funnel portion and the fixed funnel portion opposing one another to define a generally conical opening sized to guide the end of the cable to be terminated;

a funnel stop limiting motion of the movable funnel portion in a first direction; and a first elastic element biasing the movable funnel portion in the first direction.

* * * * *